US005282892A

United States Patent [19]

Laufs

[11] Patent Number: 5,282,892

[45] Date of Patent: Feb. 1, 1994

[54] DAMPENING-SOLUTION CONCENTRATE AND DAMPENING SOLUTION AND METHOD OF USE THEREOF IN THE OFFSET PRINTING PROCESS

[75] Inventor: Fritz Laufs, Ahnsbeck, Fed. Rep. of Germany

[73] Assignee: Heidelberger Druckmaschinen AG, Heidelberg, Fed. Rep. of Germany

[21] Appl. No.: 908,471

[22] Filed: Jul. 6, 1992

[30] Foreign Application Priority Data

Jul. 4, 1991 [DE] Fed. Rep. of Germany ....... 4122233
Jun. 24, 1992 [DE] Fed. Rep. of Germany ....... 4220550

[51] Int. Cl.[5] ................................ C09K 3/18

[52] U.S. Cl. ................................ 106/2; 101/451

[58] Field of Search ................................ 106/2; 101/451

[56] References Cited

U.S. PATENT DOCUMENTS

| | | | |
|---|---|---|---|
| 4,278,467 | 7/1981 | Fadner | 106/2 |
| 4,641,579 | 2/1987 | Bernstein | 106/2 |
| 4,798,627 | 1/1989 | Schmitt et al. | 106/2 |
| 4,854,969 | 8/1989 | Bassemir et al. | 106/2 |

FOREIGN PATENT DOCUMENTS

| | | |
|---|---|---|
| 0251621 | 1/1988 | European Pat. Off. . |
| 3536485 | 4/1987 | Fed. Rep. of Germany . |

*Primary Examiner*—Helene Klemanski
*Attorney, Agent, or Firm*—Herbert L. Lerner; Laurence A. Greenberg

[57] ABSTRACT

A dampening-solution concentrate consisting essentially of 1-15% by weight of buffer substances; 2-20% by weight of an additive, consisting of at least one of the substances: water-soluble polysaccharides, polyglycols and polyhydric alcohols; 2-10% by weight of preserving agent; 0.01-5% by weight of non-ionic, low foam tenside, consisting of at least one of the substances: tertiary acetylene glycol, ethyleneoxide/propyleneoxide tenside, fatty-alcohol ethoxylates, weight of a compound of the formula $C_4H_9—O[—CH_2—CH_2—O]_n—H$, where n is an integer from 1 to 10 or a mixture of these components; 0.1-10% by weight of 2-ethyl-1, 3-hexane diol; and 25-90% by weight of water; and a dampening solution formed therewith, as well as a method of use thereof.

9 Claims, No Drawings

DAMPENING-SOLUTION CONCENTRATE AND DAMPENING SOLUTION AND METHOD OF USE THEREOF IN THE OFFSET PRINTING PROCESS

The invention relates to a dampening-solution concentrate and a dampening solution, and a method of use thereof in the offset printing process.

In offset printing, aluminum plates having a hydrophilic surface in non-image areas and bearing a hydrophobic coating in image areas are conventionally clamped onto an impression cylinder. The hydrophilic and hydrophobic areas are disposed in one plane, for which reason offset printing is also known as "flatbed printing". During printing, in addition to using printing ink, there is a need for dampening solution, which has the purpose of keeping non-image areas hydrophilic, so that the printing ink is accepted only by hydrophobic areas and is transferred via a rubber blanket to stock which is to be printed. Conventionally, various types of substances are added to the dampening solution in order to stabilize the offset printing process, the purpose of such substances being, for example, to optimize compatibility with the printing ink, the pH value or the viscosity, or to minimize problems caused by water of differing hardness. Further substances in conventional dampening-solution additives serve to protect the plate as well as to prevent microbial attack on the system.

In printing presses having so-called alcohol dampening units, isopropyl alcohol is added to the dampening solution in addition to a conventional dampening-solution additive. The task of this alcohol is to ensure optimum wetting of the printing form and, thereby, to ensure the required quality of printing.

For reasons of environmental protection, workplace hygiene and cost savings, efforts have been made to develop dampening-solution compositions which permit printing without isopropyl alcohol.

However, the selection of alcohol substitutes in formulating dampening solution compounds has turned out to be very problematic with respect to the influence of such additives on the ink/water balance, i.e. the water absorbtion of the ink. Many alcohol substitute agents cause increased water absorption of the ink which results in considerable problems in the printing process, e.g. emulsifying and scumming.

European Patent EP A 0 251 621 describes a water-based dampening solution, i.e. a dampening-solution concentrate which contains substitute agents for isopropyl alcohol. According to the examples disclosed in the reference, the dampening solution additive and the alcohol substitute are added separately (two-component system). Furthermore, the solution or concentrate contains a hydrotropic agent, in order to increase the solubility of surface-active agents. The object is to prevent the precipitation of the highly proportioned cross-linking agent. But the use of these hydrotropic components leads to the above-mentioned disturbances in the ink-/water balance.

Furthermore, such two-component systems cause problems, with the dampening solution having to be prepared from a conventional dampening solution additive and an alcohol substitute to be added separately. One of the main difficulties is based on the fact that automatic metering equipment presently in use does not permit such a procedure. Printing shops must be suitably equipped if such a method is to performed.

Also U.S. Pat. No. 4,278,467 describes a dampening solution containing a substitute agent for isopropyl alcohol which, however, is presented as a two-component system.

Yet another problem associated with formulating isopropyl alcohol-free dampening solutions is found in the fact that alcohol substitute agents of limited water-solubility frequently are not compatible and cannot be mixed with the remaining components of the formula. Attempts have been made, as described for example in the above-mentioned EP 0 251 621, to solve this problem by using hydrotropic agents or emulsifiers. These additives, however, lead to the above-mentioned difficulties, so that the use of such agents in dampening solution circulation systems generally is not possible.

A further problem related with formulating an isopropyl alcohol-free one-component system has been encountered when butoxyethanol is used as an alcohol substitute at relatively higher concentrations (approximately above 1% per volume of the total dampening solution); the butoxyethanol has a destructive effect on the printing form layer and leads to excessive and premature wear of the printing form.

Finally, it must be taken into account in its formulation that a dampening solution must only have a certain value range for dynamic surface tension.

It is accordingly an object of the invention to provide a dampening solution concentrate and a dampening solution for offset printing machines, which overcomes the hereinaforementioned disadvantages of the heretofore-known devices of this general type and which provides a dampening-solution as a one-component system for offset printing which offers the properties of conventional dampening-solution additives and alcohol-substitute products; which further prevents the aforementioned problems; and which nevertheless attains a printing quality which is comparable to that achieved when isopropyl alcohol is used in dampening solutions.

With the foregoing and other objects in view, there is provided, in accordance with the invention, a dampening-solution concentrate which consists essentially of:

a) 1–15% by weight of buffer substances;
b) 2–20% by weight of an additive, consisting of at least one of the substances: water-soluble polysaccharides, polyglycols and polyhydric alcohols;
c) 2–10% by weight of preservatives;
d) 0.01–5% by weight of non-ionic, low foam tenside, consisting of at least one of the substances: tertiary acetylene glycol, ethylene-oxide/propylene-oxide tenside, fatty-alcohol ethoxylates, fatty-acid ethoxylates and siloxane alkoxylates;
e) 1–35% by weight of a compound of the formulation $$C_4H_9—O[—CH_2—CH_2—O]_n—H,$$

where n is an integer from 1 to 10 or a mixture of these compounds;

f) 0.1–10% by weight of 2-ethyl-1, 3-hexane diol; and
g) 25–90% by weight of water.

In accordance with another feature of the invention, the amount of buffer substances is chosen at 5–15% by weight.

In accordance with a further feature of the invention, the following substances are used as a compound of the formula $C_4H_9—O[—CH_2—CH_2—O]_n—H$: butoxyethanol, particularly at 1–12% by weight, or butyltriglycol, butyltetraglycol, butylpentaglycol, each individually or in any mixture.

In accordance with another feature of the invention, the additive consists of at least one of the substances: gum arabic, polyethylene glycol and glycerine.

In accordance with again another feature of the invention, the concentrate additionally includes polyhydric alcohols as solubilizers and additives, as well as pigments.

In accordance with again a further feature of the invention, the dampening-solution concentrate further includes monohydric or polyhydric alcohols.

In accordance with an added feature of the invention, the percentage by weight of the components d) to f) of the dampening-solution concentrate are adjusted to one another so that the dampening solution has a surface tension of 30–50 mN/m. This is the case with a dampening solution that is produced in a conventional manner of a dampening solution concentrate according to the invention.

Due to the high press speeds, a dynamic method must be selected for measuring the surface tension. Surface tensiometers are therefore not suitable.

The buffer substances which are used may be, for example, di- and tricarboxylic acids, such as citric acid or malic acid, mineral acids, such as phosphoric acid, alkali hydroxides, such as sodium hydroxide, or phosphates, such as sodiumdihydrogen phosphate.

The water-soluble polysaccharides, polyglycols or polyhydric alcohols serve, in particular, to protect the printing form.

The preserving agents used may, for example, be isothiazolinone, benzyl alcohol hemiformal, n-methylol chloroacetamide.

The non-ionic, low foam tensides are commercially available, for example, under the following names: Surfynol 104 (tertiary acetylene glycol), Disponil LS2 (fatty-alcohol ethoxylates) and Marlosol (fatty-acid ethoxylates).

Other features which are considered as characteristic for the invention are set forth in the appended claims.

Although the invention is illustrated and described herein as embodied in a dampening solution concentrate and a dampening solution for offset printing machines, it is nevertheless not intended to be limited to the details shown and described, since various modifications may be made therein without departing from the spirit of the invention and within the scope and range of equivalents of the claims.

The construction of the invention, however, together with additional objects and advantages thereof will be best understood from the following specific examples, which corroborate the particularly advantageous effects of the dampening-solution concentrate in greater detail.

EXAMPLE 1

In 66.2 parts by weight of water, the following substances were dissolved: 1.3 parts by weight of citric acid, 0.25 parts by weight of disodium hydrogen phosphate, 0.3 parts by weight of caustic soda, 5 parts by weight of glycerine and 3 parts by weight of preserving agent (Parmentol K50®). Added thereto were 4 parts by weight of butoxyethanol, 3 parts by weight of 2-ethyl-1,3-hexane diol and 0.05 parts by weight of the tenside mixture according to component d).

Then, 1.2 kg of this mixture was mixed with 28.8 kg of water. The dampening solution was poured into a circulating system of a 2-color sheet-fed press of the Heidelberger Speedmaster type and the temperature of the dampening solution was stabilized at approximately 12° C.

The printing tests were performed with the following materials:

| | |
|---|---|
| Ink: | Universa 6000 ® R |
| Printing plate: | Base of anodized aluminum, type T 7, manufactured by Eggen |
| Paper: | CRS (paper coated on both sides, manufactured by MD) |

There were no technical printing-related problems such as scumming, piling-up, sticking of the ink or foaming of the dampening solution. It was even possible after an extended period of time, e.g. 3 weeks, to produce decidedly high-quality prints without any technical printing-related problems.

EXAMPLE 2

In 66.2 parts by weight of water, the following were dissolved: 1.5 parts by weight of citric acid, 0.4 parts by weight of disodium hydrogen phosphate, 6 parts by weight of glycerine and 3 parts by weight of a preserving agent (Parmentol K50®).

Added thereto were 8 parts by weight of 2-ethyl-1,3-hexane diol, 2 parts by weight of butoxyethanol, 0.01 parts by weight of the aforementioned tenside mixture.

1.3 kg of this mixture was mixed with 28.7 kg of water. This mixture was used as described in Example 1. The same materials as in Example 1 were used for the printing tests.

With a water ratio of 30–50%, the dampening solution yielded high-quality prints.

EXAMPLE 3

The following substances were dissolved in 63.8 parts by weight of water: 1.1 parts by weight of citric acid, 0.2 parts by weight of disodium hydrogen phosphate, 0.1 parts by weight of caustic soda, 7 parts by weight of glycerine and 4 parts by weight of a preserving agent (Parmentol K50®). Added thereto were 6 parts by weight of butoxyethanol, 4 parts by weight of 2-ethyl-1,3-hexane diol and 0.02 parts by weight of the aforementioned tenside mixture.

Then, 1.9 kg of this mixture was mixed with 28.1 kg of water. This mixture was used as described in Example 1. The same materials as in Example 1 were used for the printing tests.

With a water ratio of 30–50%, the dampening solution yielded high-quality prints.

EXAMPLE 4

The following substances were dissolved in 66 parts by weight of water: 1.8 parts by weight of malic acid, 0.35 parts by weight of disodium hydrogen phosphate, 2 parts by weight of gum arabic, 3 parts by weight of a preserving agent (Parmentol K50®). Added thereto were 3 parts by weight of butoxyethanol, 2 parts by weight 2-ethyl-1,3-hexane diol and 0.03 parts by weight of the aforementioned tenside mixture. Then, 2 kg of this mixture was mixed with 28 kg of water.

The dampening solution was poured into a circulating system of a 2-color sheet-fed press of the Roland Rekord type and the temperature of the dampening solution was stabilized at approximately 13° C.

The same materials as in Example 1 were used for the printing tests.

With a water ratio of 30-50%, the dampening solution yielded high-quality prints.

EXAMPLE 5

The following substances were dissolved in 66.2 parts by weight of water: 1.3 parts by weight of citric acid, 0.25 parts by weight of disodium hydrogen phosphate, 0.3 parts by weight of sodium hydroxide, 5 parts by weight of glycerin and 3 parts by weight of a preserving agent (Parmentol K50®). Added to this are 4 parts by weight of butyltriglycol, 3 parts by weight of 2-ethyl-1,3-hexane diol and 0.05 parts by weight of the tenside mixture according to component d).

Subsequently, 1.2 kg of this mixture was mixed with 28.8 kg of water.

The dampening solution was poured into the circulation system of a two-color sheet-fed printing press of the type Heidelberger Speedmaster and its temperature was stabilized at approximately 12° C.

The printing tests were performed with the following materials:

| | |
|---|---|
| Ink: | ALPHA 4300 |
| Printing plate: | Base of anodized aluminum, type T 7, manufactured by Eggen |
| Paper: | Ratio 100 g/m² art paper |

No technical printing-related problems were detected. Even after an extended period of time, e.g. after 3 weeks, decidedly high-quality prints could still be produced without any technical printing-related problems.

EXAMPLE 6

The following substances were dissolved in 66.2 parts by weight of water: 1.3 parts by weight of citric acid, 0.25 parts by weight of disodium hydrogen phosphate, 0.3 parts by weight of sodium hydroxide, 5 parts by weight of glycerin and 3 parts by weight of a preservative (Parmentol K50®). Added to this were 6 parts by weight of a mixture of 70% of butyltriglycol, 20% of butyltetraglycol and 10% of butylpentaglycol, 3 parts by weight of 2-ethyl-1,3-hexane diol and 0.05 parts by weight of the tenside mixture according to component d).

Then, 1.2 kg of this mixture were mixed with 28.8 kg of water.

The dampening solution was poured into the circulation system of a two-color sheet-fed press of the type Heidelberger Speedmaster and its temperature was stabilized at about 12° C.

The printing tests were performed with the following materials:

| | |
|---|---|
| Ink: | REFLECTA FW 8000 |
| Printing plate: | Base of anodized aluminum, type T-7, manufactured by Eggen |
| Paper: | Phoenogrand 135 g/m² |

There did not occur any technical printing-related problems. Even after an extended period of time, e.g. after 3 weeks, decidedly high-quality prints could still be produced without any technical printing-related problems.

REFERENCE EXAMPLES

REFERENCE EXAMPLE 1

The following substances were dissolved in 38 parts by weight of water: 1.3 parts by weight of citric acid, 0.25 parts by weight of disodium hydrogen phosphate, 0.3 parts by weight of caustic soda, 5 parts by weight of glycerine and 3 parts by weight of a preserving agent (Parmentol K50®). Added thereto were 4 parts by weight of butoxyethanol.

1.2 kg of this mixture was mixed with 28.8 kg of water.

Then, the same procedure as in Example 1 was employed.

The thus obtained prints were not of satisfactory quality. Even at the maximum water ratio corresponding to 100% (standard with isopropyl alcohol approx. 30%), there are technical printing-related problems, namely scumming.

REFERENCE EXAMPLE 2

The following substances were dissolved in 38 parts by weight of water: 1.3 parts by weight of citric acid, 0.25 parts by weight of disodium hydrogen phosphate, 0.3 parts by weight of caustic soda, 5 parts by weight of glycerine and 3 parts by weight of a preserving agent (Parmentol K50®). Added thereto were 3 parts by weight of 2-ethyl-1,3-hexane diol.

1.2 kg of this mixture was mixed with 28.8 kg of water.

Then, the same procedure as in Example 1 was employed.

REFERENCE EXAMPLE 3

The following substances were dissolved in 38 parts by weight of water: 1.3 parts by weight of citric acid, 0.25 parts by weight of disodium hydrogen phosphate, 0.3 parts by weight of caustic soda, 5 parts by weight of glycerine and 3 parts by weight of a preserving agent (Parmentol K50®). Added thereto were 0.25 parts by weight of a tenside mixture containing tertiary acetylene glycols, EO/PO tensides, fatty-acid ethoxylates and fatty-alcohol ethoxylates.

1.2 kg of this mixture was mixed with 28.8 kg of water.

Then, the same procedure as in Example 1 was employed.

The dampening solution did not yield satisfactory print quality. Even at the maximum water ratio, not only was scumming observed, but also emulsification of the ink.

I claim:

1. A hydrotrope-free dampening-solution concentrate consisting essentially of:
   - a) 1-15% by weight of buffer substances;
   - b) 2-20% by weight of an additive, consisting of at least one of the substances: water-soluble polysaccharides, polyglycols and polyhydric alcohols;
   - c) 2-10% by weight of preservatives;
   - d) 0.01-5% by weight of non-ionic, low foam tenside, consisting of at least one of the substances selected from the group consisting of tertiary acetylene glycol, ethylene-oxide/propylene-oxide tenside, fatty-alcohol ethoxylates, fatty-acid ethoxylates and siloxane alkoxylates;
   - e) 1-35% by weight of a compound of the formula $C_4H_9—O[—CH_2—CH_2—O]_n—H$, where n is an integer from 1 to 10 or a mixture of these compounds;

f) 0.1–10% by weight of 2-ethyl-1,3-hexane diol; and g) 25–90% by weight of water.

2. Dampening-solution concentrate according to claim 1, wherein the buffer substances are present in an amount of 5–15% by weight.

3. Dampening-solution concentrate according to claim 1, wherein butoxyethanol is contained as a compound in the formulation $C_4H_9—O[—CH_2—CH_2—O]_n—H$.

4. Dampening-solution concentrate according to claim 3, wherein said butoxyethanol is present in an amount of 1–12% by weight.

5. Dampening-solution concentrate according to claim 1, wherein the additive consists of at least one of the substances: gum arabic, polyethylene glycol and glycerine.

6. Dampening-solution concentrate according to claim 2, which further includes monohydric or polyhydric alcohols.

7. A hydrotrope-free dampening-solution, comprising a dampening-solution concentrate consisting essentially of:

a) 1–15% by weight of buffer substances;

b) 2–20% by weight of an additive, consisting of at least one of the substances: water-soluble polysaccharides, polyglycols and polyhydric alcohols;

c) 2–10% by weight of preserving agent;

d) 0.01–5% by weight of non-ionic, low foam tenside, consisting of at least one of the substances selected from the group consisting of tertiary acetylene glycol, ethylene-oxide/propylene-oxide tenside, fatty-alcohol ethoxylates, fatty-acid ethoxylates and siloxane alkoxylates;

e) 1–35% by weight of a compound of the formula $C_4H_9—O[—CH_2—CH_2—O]_n—H$, where n is an integer from 1 to 10 or a mixture of these compounds;

f) 0.1–10% by weight of 2-ethyl-1,3-hexane diol; and g) 25–90% by weight of water;

said components d) to f) of said dampening-solution concentrate being adjusted with respect to one another so that the dampening solution has a surface tension of 30–50 mN/m.

8. An offset printing process, which comprises the step of applying an hydrotrope-free dampening solution to a printing plate, the hydrotrope-free dampening solution comprising a concentrate consisting essentially of:

a) 1–15% by weight of buffer substances;

b) 2–20% by weight of an additive, consisting of at least one of the substances: water-soluble polysaccharides, polyglycols and polyhydric alcohols;

c) 2–10% by weight of preserving agent;

d) 0.01–5% by weight of non-ionic, low foam tenside, consisting of at least one of the substances selected from the group consisting of tertiary acetylene glycol, ethylene-oxide/propylene-oxide tenside, fatty-alcohol ethoxylates, fatty-acid ethoxylates and siloxane alkoxylates;

e) 1–35% by weight of a compound of the formulation $C_4H_9—O[—CH_2—CH_2—O]_n—H$, where n is an integer from 1 to 10 or a mixture of these compounds;

f) 0.1–10% by weight of 2-ethyl-1,3-hexane diol; and g) 25–90% by weight of water.

9. The offset printing process according to claim 8, which comprises, prior to applying the dampening solution into the printing plate, adjusting the percentage by weight of the components d) to f) of the concentrate to one another so that the dampening solution has a surface tension of 30–50 mN/m.

* * * * *